(12) United States Patent
Ito

(10) Patent No.: US 11,503,272 B2
(45) Date of Patent: Nov. 15, 2022

(54) INFORMATION PROCESSING APPARATUS, INFORMATION PROCESSING METHOD AND STORAGE MEDIUM

(71) Applicant: CANON KABUSHIKI KAISHA, Tokyo (JP)

(72) Inventor: Hironao Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/204,083

(22) Filed: Mar. 17, 2021

(65) Prior Publication Data

US 2021/0306616 A1    Sep. 30, 2021

(30) Foreign Application Priority Data

Mar. 24, 2020 (JP) .............................. JP2020-052631

(51) Int. Cl.
*H04N 13/282* (2018.01)
*H04N 13/178* (2018.01)
(Continued)

(52) U.S. Cl.
CPC ............ *H04N 13/282* (2018.05); *G06T 7/73* (2017.01); *H04N 13/178* (2018.05); *H04N 13/279* (2018.05)

(58) Field of Classification Search
None
See application file for complete search history.

(56) References Cited

U.S. PATENT DOCUMENTS

| 5,745,126 A * | 4/1998 | Jain ...................... H04N 13/156 348/E13.058 |
| 2018/0204381 A1 * | 7/2018 | Kanatsu ................ G06T 19/003 |

(Continued)

FOREIGN PATENT DOCUMENTS

JP    2017-211828 A    11/2017

OTHER PUBLICATIONS

Xueting Wang, Kensho Hara, Yu Enokibori, Takatsugu Hirayama, Kenji Mase, "Personal Viewpoint Navigation Based on Object Trajectory Distribution for Multi-View Videos", Jan. 1, 2018, IEICE, IEICE Transactions on Information and Systems, vol. E101-D, No. 1, pp. 193-204.*

(Continued)

*Primary Examiner* — Robert Bader
(74) *Attorney, Agent, or Firm* — Carter, DeLuca & Farrell LLP

(57) ABSTRACT

The technology disclosed herein is an information processing apparatus comprising: one or more memories storing instructions; and one or more processors executing the instructions to function as: an obtaining unit configured to obtain information for specifying a position of an object included in multi-viewpoint image data obtained by image capturing using a plurality of imaging apparatuses; and a generation unit configured to generate a virtual viewpoint path data to generate virtual viewpoint image data by inputting the information obtained by the obtaining unit to an output unit which is a learned model learned from the virtual viewpoint path data to be training data and at least information for specifying a position of an object to be input data corresponding to the virtual viewpoint path data and is configured to output virtual viewpoint data by receiving input of information for specifying a position of an object.

11 Claims, 11 Drawing Sheets

(51) Int. Cl.
    *H04N 13/279*    (2018.01)
    *G06T 7/73*      (2017.01)

(56) References Cited

U.S. PATENT DOCUMENTS

2019/0066733 A1*  2/2019  Somanath ............ G11B 27/036
2021/0134058 A1   5/2021  Ito et al.

OTHER PUBLICATIONS

Hannes Fassold, "Automatic Camera Path Generation from 360° Video", Oct. 21, 2019, Springer, International Symposium on Visual Computing 2019: Advances in Visual Computing, pp. 505-514.*

* cited by examiner

FIG.5A

| THREE-DIMENSIONAL MODEL | | | |
|---|---|---|---|
| timecode | 00:01:02:03 | | |
| ID | x | y | z |
| 1 | 244.02 | 348.03 | 1.02 |
| 2 | 249.04 | 348.03 | 1.02 |
| 3 | 254.11 | 348.03 | 1.02 |
| ⋮ | ⋮ | ⋮ | ⋮ |
| N | 12030.03 | 12144.04 | 2003.44 |

FIG.5B

| THREE-DIMENSIONAL MODEL (BARYCENTRIC COORDINATES) | | | |
|---|---|---|---|
| timecode | 00:01:02:03 | | |
| ID | x | y | z |
| 1 | 244.02 | 348.03 | 1002.42 |
| 2 | 10304.02 | 1331.04 | 1000.44 |
| 3 | 20430.02 | 28044.03 | 800.12 |
| ⋮ | ⋮ | ⋮ | ⋮ |
| N | 12030.03 | 12144.04 | 933.33 |

FIG.5C

| VIRTUAL VIEWPOINT PATH | | | | | | | | | |
|---|---|---|---|---|---|---|---|---|---|
| frame | timecode | x | y | z | X | Y | Z | n | zoom |
| 1 | 00:01:02:03 | 3004.25 | 2582.31 | 10002.44 | 32.43 | -23.33 | 0 | 0 | 80 |
| 2 | 00:01:02:04 | 3005.02 | 2583.59 | 10001.23 | 32.43 | -23.33 | 0 | 0 | 80 |
| 3 | 00:01:02:05 | 3006.99 | 2584.23 | 10002.49 | 32.43 | -23.33 | 0 | 0 | 80 |
| ⋮ | ⋮ | ⋮ | ⋮ | ⋮ | ⋮ | ⋮ | ⋮ | ⋮ | ⋮ |
| N | hh:mm:ss:ff | 2300.4 | 2000.45 | 1023.54 | 194.32 | 12.42 | 0 | 0 | 80 |

FIG.5D

| ADDITIONAL INFORMATION | | |
|---|---|---|
| TYPE OF ATHLETICS | SOCCER | |
| FIELD COORDINATES | (startX,startY) | (-53000,-36000) |
| | (endX,endY) | (53000,36000) |
| GOAL POSITION 1 | (x,y) | (-52000,0) |
| GOAL POSITION 2 | (x,y) | (52000,0) |

FIG.5E

| THREE-DIMENSIONAL MODEL (BARYCENTRIC COORDINATES) | | | | | |
|---|---|---|---|---|---|
| timecode | 00:01:02:03 | | | | |
| ID | x | y | z | team | type |
| 1 | 244.02 | 348.03 | 1002.42 | - | ball |
| 2 | 10304.02 | 1331.04 | 1000.44 | A | human |
| 3 | 20430.02 | 28044.03 | 800.12 | A | human |
| ⋮ | ⋮ | ⋮ | ⋮ | | |
| N | 12030.03 | 12144.04 | 933.33 | B | human |

INFORMATION PROCESSING APPARATUS, INFORMATION PROCESSING METHOD AND STORAGE MEDIUM

BACKGROUND

Field

The present disclosure relates to technology for generating a virtual viewpoint image.

Description of the Related Art

There is an image processing system capable of generating a virtual viewpoint image viewed from a designated virtual viewpoint based on images captured by an image capturing system using a plurality of image capturing apparatuses. The system of Japanese Patent Laid-Open No. 2017-211828 is capable of generating a virtual viewpoint image by processing images captured by a plurality of image capturing apparatuses.

In the image processing system for generating the virtual viewpoint image, there is a method in which the virtual viewpoint is designated based on a user input. Japanese Patent Laid-Open No. 2017-211828 discloses, for example, a method in which a user designates the virtual viewpoint and a method in which the virtual viewpoint is automatically returned to a position satisfying a constraint in a case where the constraint is imposed in a layout region of the virtual viewpoint and the position to which the virtual viewpoint designated by the user is moved does not satisfy the constraint.

However, the users designating the virtual viewpoint every time the user generates the virtual viewpoint image takes the user great time and effort. On the other hand, in a case where the virtual viewpoint is fixedly defined in advance, there is a possibility that a virtual viewpoint not suitable for a scene to be generated of the virtual viewpoint image is set.

SUMMARY

The technology disclosed herein is an information processing apparatus comprising: one or more memories storing instructions: and one or more processors executing the instructions to function as: an obtaining unit configured to obtain information for specifying a position of an object included in multi-viewpoint image data obtained by image capturing using a plurality of imaging apparatuses; and a generation unit configured to generate a virtual viewpoint path data to generate virtual viewpoint image data by inputting the information obtained by the obtaining unit to an output unit which is a learned model learned from the virtual viewpoint path data to be training data and at least information for specifying a position of an object to be input data corresponding to the virtual viewpoint path data and is configured to output virtual viewpoint data by receiving input of information for specifying a position of an object.

Further features of the present disclosure will become apparent from the following description of exemplary embodiments with reference to the attached drawings.

BRIEF DESCRIPTION OF THE DRAWINGS

FIG. 5A is a diagram showing a structure of input data and training data relating to the present disclosure;

FIG. 5B is a diagram showing a structure of input data and training data relating to the present disclosure:

FIG. 5C is a diagram showing a structure of input data and training data relating to the present disclosure;

FIG. 5D is a diagram showing a structure of input data and training data relating to the present disclosure;

FIG. 5E is a diagram showing a structure of input data and training data relating to the present disclosure;

DESCRIPTION OF THE EMBODIMENTS

First Embodiment

A first embodiment of the present disclosure will be described below.

Figure 1:
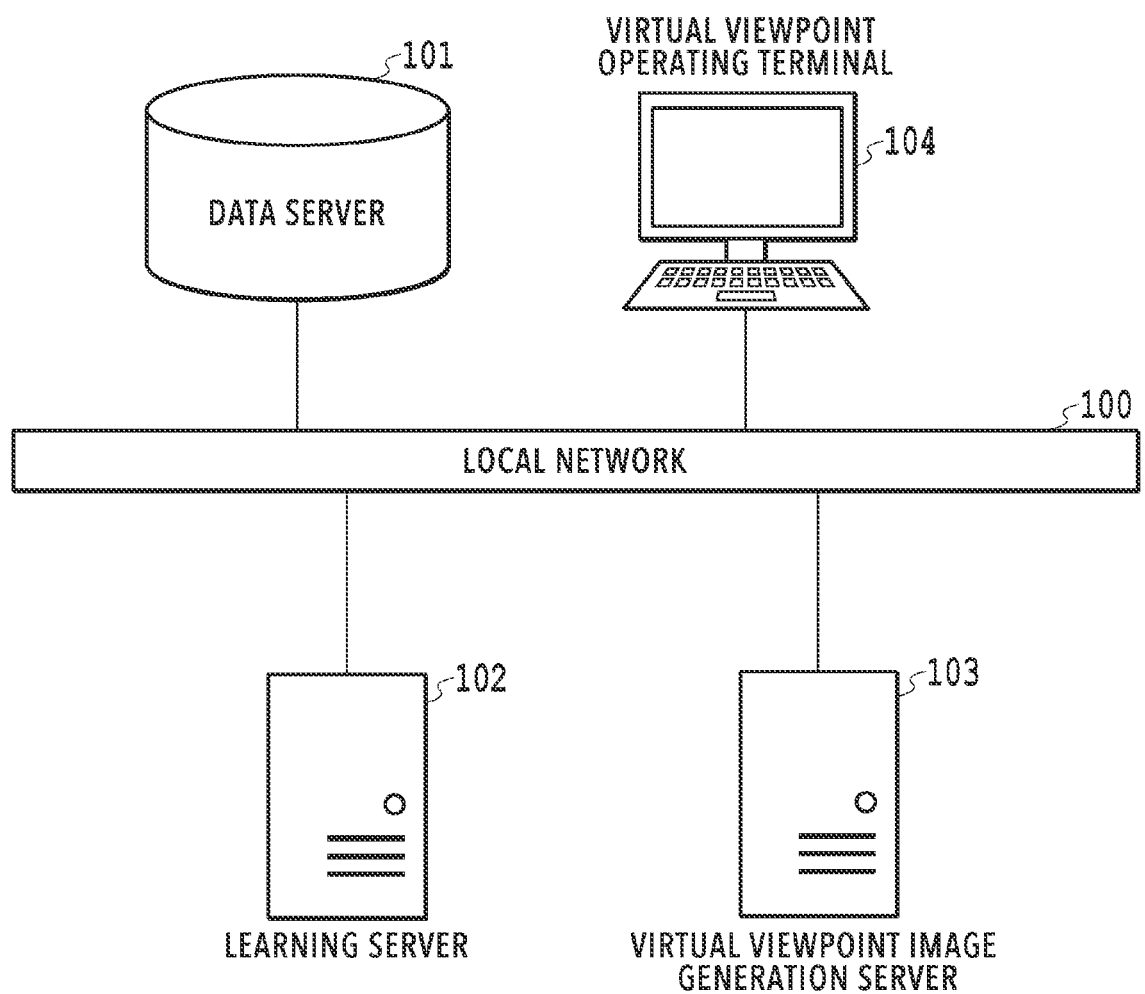
FIG. 1 is a diagram showing a system to which the present disclosure is applicable.

FIG. 1 is a diagram showing an example of a system to which the present embodiment is applicable. The present system comprises a data server 101, a learning server 102, a virtual viewpoint image generation server 103, an information processing apparatus of a virtual viewpoint operating terminal 104, and a local network 100 connecting therebetween. The data server 101 stores data necessary for generation of virtual viewpoint image data. The learning server 102 performs learning of a virtual viewpoint path generation unit automatically generating a virtual viewpoint. The virtual viewpoint operating terminal 104 comprises a UI for operating the virtual viewpoint by a user.

Figure 2:
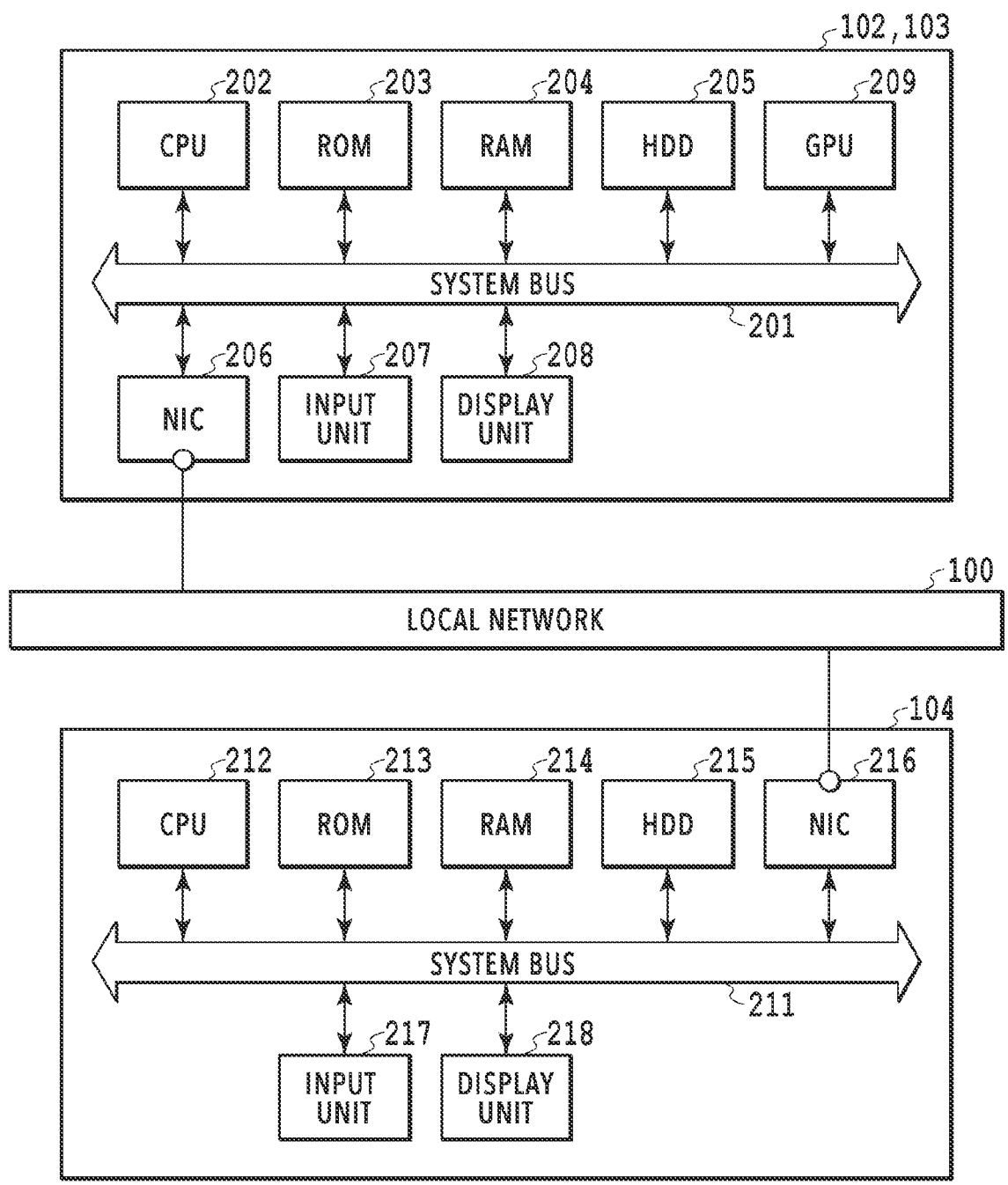
FIG. 2 is a diagram showing hardware resources of each apparatus constituting the system of FIG. 1.

FIG. 2 is a diagram illustrating hardware resources of each server constituting the system of FIG. 1. A CPU 202 controls the entire computer using a computer program or data stored in a ROM 203 or a RAM 204. In other words, the CPU 202 functions as each processing unit shown in FIG. 3, which will be described later. The ROM 203 stores setting data and a boot program or the like of the present computer. The RAM 204 has an area for temporarily storing, for example, the computer program or data loaded from an external storage apparatus 205 or data obtained externally via a network interface card (NIC) 206. The RAM 204 further has a work area used in a case where the CPU 202 carries out various processes, which means that the RAM 204 is capable of allocating the area as frame memory and appropriately providing other various areas for example.

An input unit 207 includes a keyboard and mouse or the like and is capable of inputting various instructions to the CPU 202 through the operation by the user. A display unit 208 displays the processing result by the CPU 202. The display unit 208 is composed of a liquid crystal display for example. An HDD 205 is a large-capacity information storage apparatus. The HDD 205 stores a computer program for causing the CPU 202 to realize an operating system (OS) and the functions of each processing unit shown in FIG. 3. Further, the HDD 205 may store image data to be processed or the like. The computer program and data stored in the HDD 205 are loaded into the RAM 204 as appropriate according to control by the CPU 202 and are to be processed by the CPU 202. The NIC 206 can be connected to a network such as a LAN and the internet and other apparatuses such as a projection apparatus and a display apparatus and the present computer can obtain and transmit various pieces of information via this NIC 206. A system bus 201 is a bus connecting the respective units described above.

The CPU 202 mainly controls the operations of each configuration described above. A GPU 209 is a processor capable of high-speed data processing by parallel processing. The CPU 202 can perform high-speed computation in cooperation with the GPU 209. An integrated circuit which performs simple calculation using a plurality of cores such as a Field-Programmable Gate Array (FPGA) may also be used.

The present embodiment can also be realized by supplying the system with a storage medium in which a code of the computer program realizing the above-described functions is recorded and reading out and carrying out the code of the computer program by the system. In this case, the code of the computer program read out from the storage medium per se realizes the above-described functions of the present embodiment and the storage medium storing the code of the computer program constitutes the present disclosure. In some cases, a part of or all of the actual processing is performed, for example, by the OS working on the computer by using the above-described hardware resources based on an instruction in the code of the program such that the above-described functions are realized by this processing.

An embodiment to be described below may also be used to realize the functions. That is, a case is also included in which the computer program read out from the storage medium is written to a function expansion card inserted into the computer or memory comprised in a function expansion unit connected to the computer and based on that computer program, the CPU or the like comprised in the function expansion card or the function expansion unit performs a part of or all of the actual processing to realize the above-described functions.

In the case of applying the present embodiment to the above-described storage medium, the storage medium stores a computer program corresponding to the processing described earlier.

Figure 3:
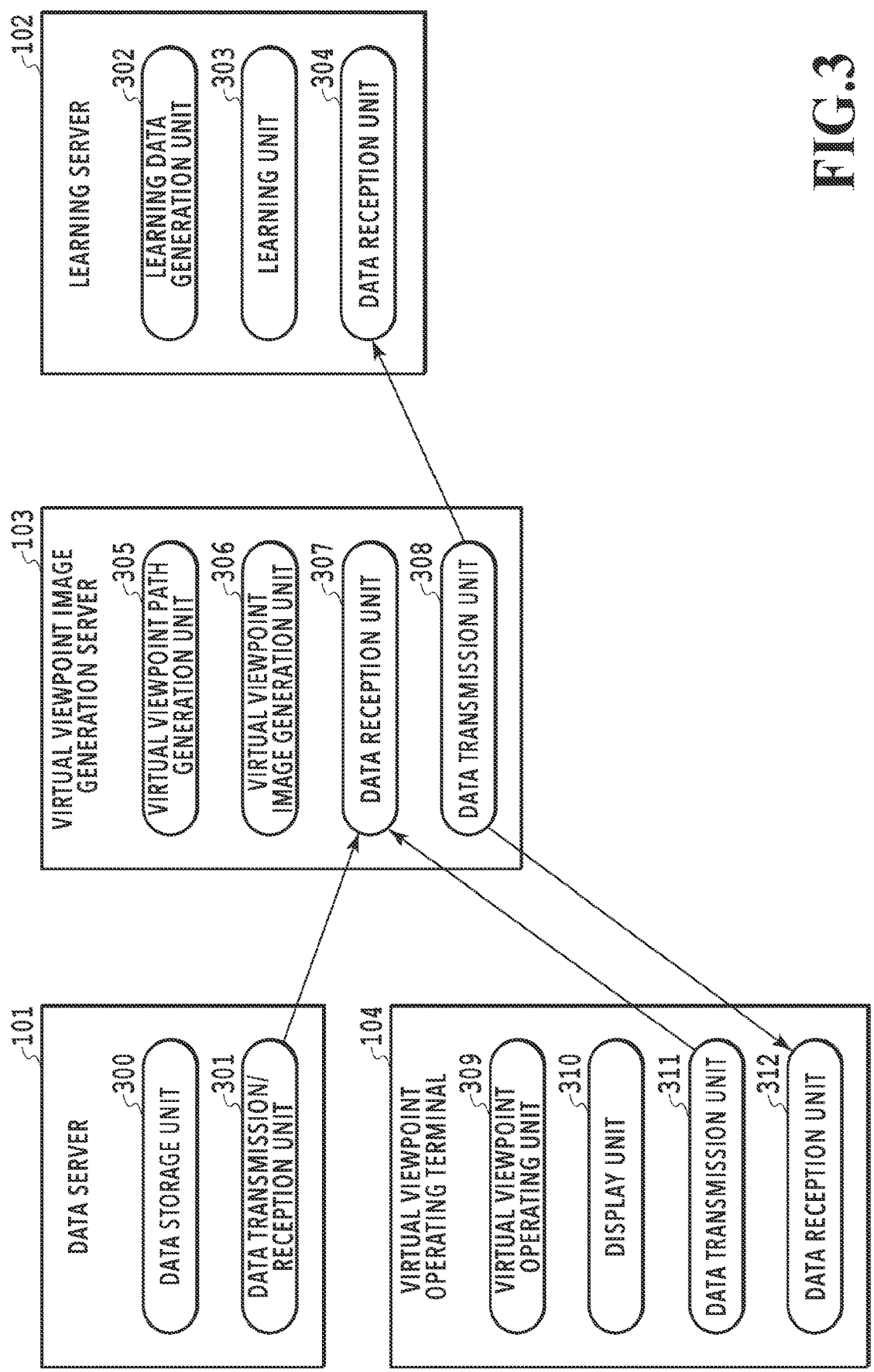
FIG. 3 is a diagram showing a software configuration realizing a first embodiment.

FIG. 3 is a diagram showing an example of a function configuration realized by using the hardware resources illustrated in FIG. 2 and the program.

The data server 101 includes a data storage unit 300 and a data transmission/reception unit 301. The data storage unit 300 stores material data of the virtual viewpoint image. The material data includes, for example, a three-dimensional model indicating the position and shape of an object included in multi-viewpoint image data obtained by synchronous image capturing using a plurality of cameras placed at different positions, and texture data attached to the three-dimensional model. In the present embodiment, the three-dimensional model of the object within an image capturing area in which a plurality of cameras capture the image and the texture data are generated from the multi-viewpoint image data, but a method of obtaining the three-dimensional model and the texture data is not limited to this. The data storage unit 300 also stores generated virtual viewpoint path data or the like. The virtual viewpoint path data of the present embodiment is information indicating the positions and directions of the virtual viewpoint at a plurality of serial points in time. In addition, the virtual viewpoint path data may include information indicating the size (angle of view) of a visual field of the virtual viewpoint at each point in time or information indicating the point in time which will be a target for generation of the virtual viewpoint image. The data transmission/reception unit 301 transmits the stored data or receives data to be stored anew.

The learning server 102 includes a learning data generation unit 302, a learning unit 303, and a data reception unit 304. The learning data generation unit 302 generates learning data and inputs it to the learning unit 303. A description will later be given of a method of generating the learning data. The learning unit 303 uses the learning data to perform learning of a virtual viewpoint path generation unit 305 generating the virtual viewpoint path data. Since the GPU 209 is capable of performing efficient computation by performing the parallel processing on a larger amount of data, it is effective to perform the processing by the GPU 209 in a case where learning is performed multiple times using a learning model such as deep learning. In view of this, the GPU 209 is used, in addition to the CPU 202, for the processing by the learning unit 303 in the first embodiment. More specifically, in the case of carrying out a learning program including the learning model, the CPU 202 performs computation in cooperation with the GPU 209 such that the learning unit 303 performs learning. Note that computation may also be performed only by either the CPU 202 or the GPU 209 for the processing of the learning unit 303.

The virtual viewpoint image generation server 103 includes a virtual viewpoint path generation unit 305, a virtual viewpoint image generation unit 306, a data reception unit 307, and a data transmission unit 308. The data reception unit 307 receives from the data server 101 the material data for generating the virtual viewpoint image. The material data includes a foreground three-dimensional model and a foreground texture image and a background three-dimensional model and a background texture image and may also include additional data or the like for improvement of image quality.

The virtual viewpoint path generation unit 305 generates the virtual viewpoint path data by receiving input of the foreground three-dimensional model, additional information to be described later, and the like. The virtual viewpoint path generation unit 305 may perform the computation using the CPU 202 and the GPU 209 similarly to the learning unit 303. The virtual viewpoint image generation unit 306 generates the virtual viewpoint image data based on the material data and the virtual viewpoint path data. The data transmission unit 308 transmits the virtual viewpoint image data to the virtual viewpoint operating terminal 104.

Figure 4:
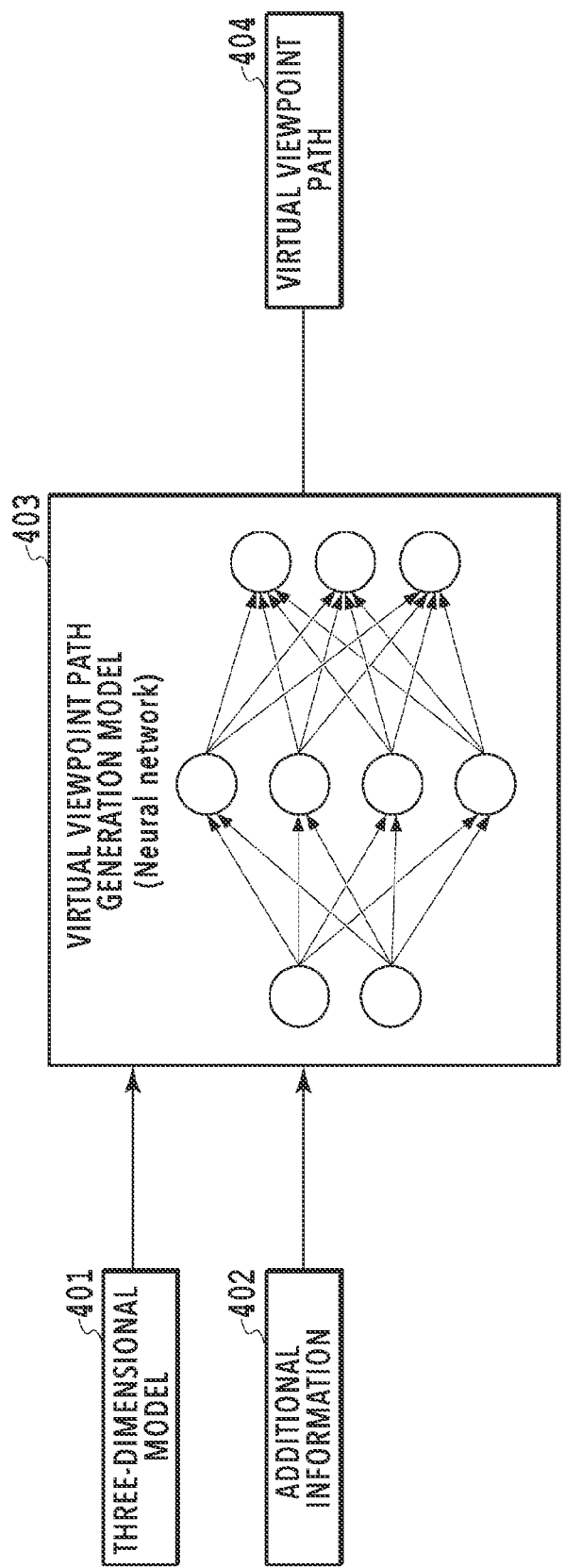
FIG. 4 is a conceptual diagram of a structure using a learning model relating to the present disclosure and composed of input data, the learning model and output data.

FIG. 4 is a conceptual diagram of a structure of input/output using the learning model of the first embodiment. A three-dimensional model 401 and additional information 402 are input to a virtual viewpoint path generation model 403 to output a virtual viewpoint path 404. The additional information 402 is not essential but optional and includes for example types of athletics to be captured and team information on the object corresponding to three-dimensional model data. The additional information 402 further includes: information about the type of model of the object corresponding to the three-dimensional model data such as a player, a ball, and a goal; field coordinate information about the athletics, goal coordinate information; and various types of line coordinate information or the like.

A learning phase of the virtual viewpoint path generation unit 305 will be described in detail below.

The virtual viewpoint path generation unit 305 generates the virtual viewpoint path using at least foreground three-dimensional model data as input. FIGS. 5A to 5E show data structures of the three-dimensional model data and the virtual viewpoint path data. The three-dimensional model data is represented by a group of points in a world coordinate system and has coordinate information on each point.

FIG. 5A shows coordinate information on all the points constituting the foreground three-dimensional model data included in a certain frame. ID is an identifier of the point and x, y, and z are the coordinates of the point.

FIG. 5B is location information for each piece of foreground three-dimensional model data obtained by considering a group of points constituting the foreground three-dimensional model data as one collectivity for each object in a certain frame and setting barycentric coordinates thereof to be a representative point. ID is an identifier of the foreground three-dimensional model data for each object and x, y, and z are the coordinates of a barycenter of the object. In the case of performing learning while using, as input, all the points included in the foreground three-dimensional model data as shown in FIG. 5A, a learning cost will increase. Thus, the learning cost may be reduced by setting the coordinates of the barycenter of the foreground three-dimensional model for each object as shown in FIG. 5B to be representative coordinates and using the representative coordinates as the input. The three-dimensional model data is data for one frame as a unit and a timecode indicating the time when a multi-viewpoint image corresponding to data of the three-dimensional model data for each frame was obtained is appended to the data.

FIG. 5C is coordinate information on virtual viewpoints across a plurality of frames included in the virtual viewpoint path data. Timecode indicates a target frame for each virtual viewpoint and x, y, and z are the coordinates of each virtual viewpoint. X, Y. Z, and n are a quaternion representing the orientation of each virtual viewpoint and further, X, Y, and Z represent the angles of orientation of the image capturing apparatus with respect to x axis, y axis, and z axis, respectively, n represents a rotation angle in a direction of an optical axis of the image capturing apparatus, and zoom represents a focal length of each virtual viewpoint.

FIG. 5D shows additional information defined with respect to data for generating one unit of the virtual viewpoint image and the additional information is composed of the type of athletics, field coordinate information, and goal coordinate information. For example, in a case where one game of soccer is captured by the image capturing apparatus to create data for generating virtual viewpoint images corresponding to that one game of soccer, the created data is counted as one unit.

FIG. 5E shows the foreground three-dimensional model data to which the additional information is appended. ID is an identifier of the foreground three-dimensional model for each object and x, y, and z are the coordinates of its representative point. Type information (type) and team information (team) are appended for the respective foreground three-dimensional models for the respective objects.

In the learning phase, the foreground three-dimensional model data and the additional information are set to be input data and the virtual viewpoint path data corresponding to the input data is set to be training data. The virtual viewpoint path data to be the training data may be data in which virtual viewpoint paths created by a plurality of users are averaged and then smoothed and may also be data of the maximum value of distribution of a plurality of virtual viewpoint paths.

Also in learning, specific data of the virtual viewpoint path data may be weighted. Since orientation (direction) has a greater effect on virtual viewpoint images than the position of the image capturing apparatus does, it is considered that weighting can be performed according to a degree of matching of the orientation of the image capturing apparatus with the orientation of the virtual viewpoint in the virtual viewpoint path data. which is the training data.

Examples of a specific algorithm for machine learning are a nearest neighbor algorithm, a Naive Bayes algorithm, a decision tree, a support vector machine, and the like. Another example is deep learning which autonomously generates a feature amount and a coupling weighting coefficient for learning using a neural network. Any algorithm which can be used of the algorithms described above can be appropriately used to apply it to the present embodiment. In the present embodiment, the deep learning is used for learning.

The learning unit 303 may comprise an error detection unit and an update unit. The error detection unit obtains an error between the training data and output data output from an output layer of the neural network in response to input data input to an input layer. The error detection unit may also calculate the error between the training data and the output data from the neural network by using a loss function. The update unit updates, based on the obtained error by the error detection unit, the coupling weighting coefficient or the like between nodes of the neural network such that the error will be reduced by using an error backward propagation method for example. The error backward propagation method is a method of arranging the coupling weighting coefficients or the like between nodes of each neural network such that the above-described error will be reduced.

Figure 6:
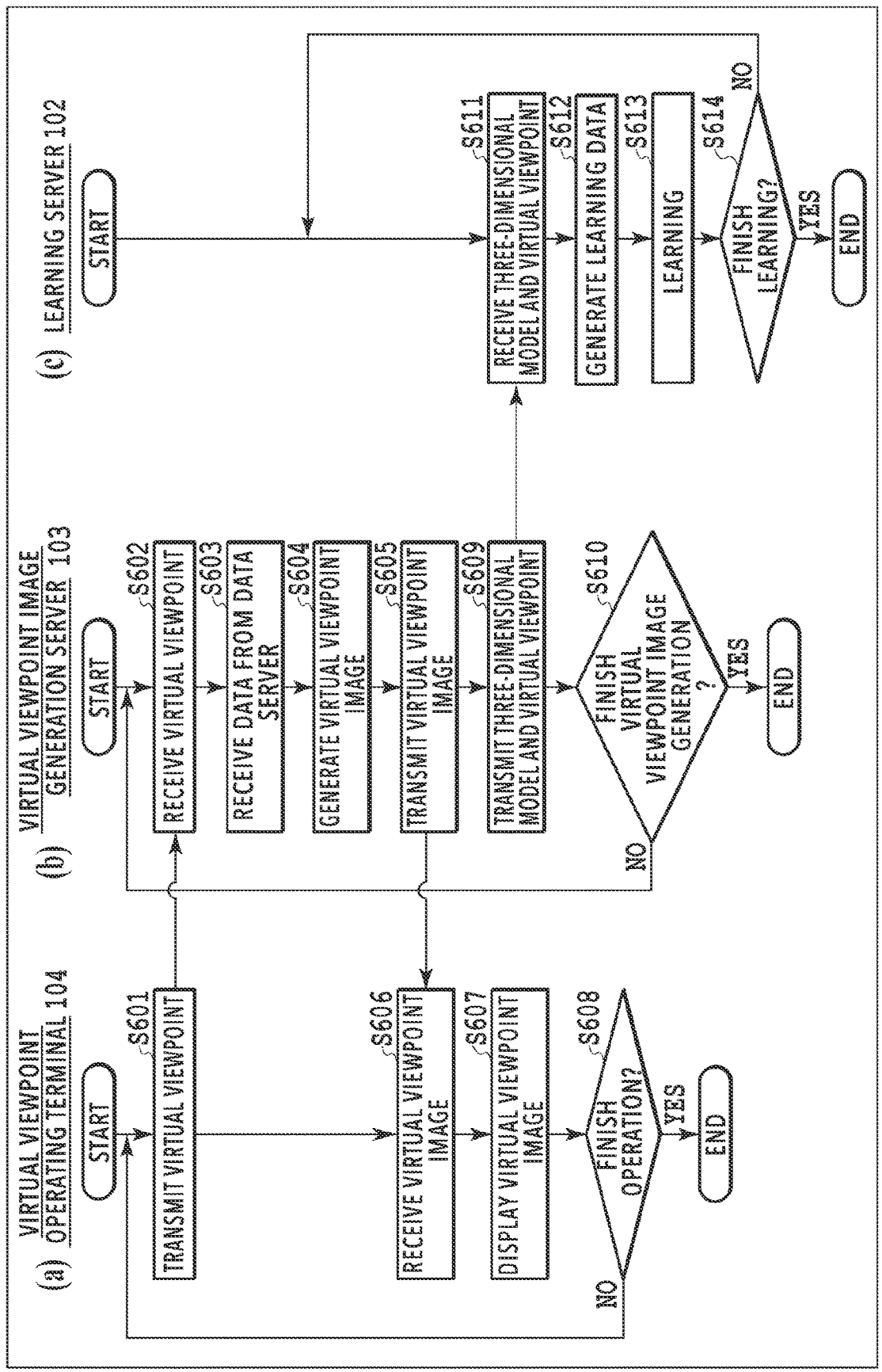
FIG. 6 is a flowchart of a learning phase in the first embodiment.

FIG. 6 is a flowchart showing a detailed flow of learning in the learning phase. Descriptions will be given of control over each apparatus in system diagrams (FIGS. 1 and 3) separately and in the order of each servers working in cooperation with each other.

In this example, the user operates the virtual viewpoint to generate the virtual viewpoint image and simultaneously inputs to the learning server 102 the operated virtual viewpoint and the three-dimensional model data to perform learning.

The virtual viewpoint operating terminal 104 generates the virtual viewpoint data based on an operation of the user by a virtual viewpoint operating unit 309 to transmit it to the virtual viewpoint image generation server 103 via a data transmission unit 311 (S601).

The virtual viewpoint image generation server 103 receives the virtual viewpoint data via the data reception unit 307 (S602).

The virtual viewpoint image generation server 103 receives from the data server 101, based on the received virtual viewpoint data, data used for generation of the virtual viewpoint image data through the data reception unit 307 (S603). Data used for the generation of the virtual viewpoint image data is foreground texture data and foreground three-dimensional model data of a frame specified by a timecode designated by the virtual viewpoint data.

The virtual viewpoint image generation server 103 uses, by the virtual viewpoint image generation unit 306, the received data used for the generation of the virtual viewpoint image data to generate the virtual viewpoint image data based on the received virtual viewpoint data (S604).

The virtual viewpoint image generation server 103 transmits the generated virtual viewpoint image data to the virtual viewpoint operating terminal 104 via the data transmission unit 308 (S605).

The virtual viewpoint operating terminal 104 receives the virtual viewpoint image data from the virtual viewpoint image generation server 103 via a data reception unit 312 (S606).

The virtual viewpoint operating terminal 104 displays the virtual viewpoint image received by a display unit 310 (S607).

In the case of finishing the operation of the virtual viewpoint image in the virtual viewpoint operating terminal 104. the processing is finished. If not, the process returns to S601 and the processing is repeated (S608).

After S605, the virtual viewpoint image generation server 103 transmits to the learning server 102 the virtual viewpoint data and the foreground three-dimensional model data used for the generation of the virtual viewpoint image data via the data transmission unit 308 (S609).

In the case of finishing the generation of the virtual viewpoint image data in the virtual viewpoint image generation server 103, the processing is finished. If not, the process returns to S602 and the processing is repeated (S610).

The learning server 102 receives from the virtual viewpoint image generation server 103 the virtual viewpoint data and the foreground three-dimensional model data via the data reception unit 304 (S611).

The learning server 102 generates, by the learning data generation unit 302, the learning data based on the received virtual viewpoint data and foreground three-dimensional model data (S612). The learning data to be generated here is learning data whose foreground three-dimensional model data is the input data and whose virtual viewpoint data is the training data.

The learning server 102 performs learning by the learning unit 303 using the generated learning data (S613). The processing is finished in the case of satisfying a condition indicating learning completion such as a case where the transmission of the virtual viewpoint data and the foreground three-dimensional model data from the virtual viewpoint image generation server 103 is stopped. In a case where the condition is not satisfied, the process returns to S611 and the processing is repeated (S614).

(Other Leaning Methods)

The present embodiment indicates a method in which learning is performed while the user operates the virtual viewpoint, but the learning may also be performed by inputting to the learning server 102 the virtual viewpoint path data created in advance and the foreground three-dimensional model data to be used. Using this method enables collecting, through the internet or the like, the virtual viewpoint path data created by many people to be used in learning. The virtual viewpoint path data which can be used in the learning comprises information on relative coordinates with respect to a foreground object or information on relative coordinates with respect to a background object such as field coordinates of the athletics, goal coordinates, and various line coordinates or the like. This means that the virtual viewpoint path data which can be used in the learning includes information capable of associating the coordinates of the virtual viewpoint path data with the coordinates of the foreground three-dimensional model data.

With respect to the learning phase, a description has been given of the method in which the foreground three-dimensional model data is used as the input data and the virtual viewpoint path data is used as the training data. Further, accuracy can be improved by giving a score indicating how well each piece of the virtual viewpoint path data has been made such that both good training data and bad training data are input.

It is also possible to perform the learning in which scene information is appended to each scene depending on the athletics to generate virtual viewpoint data suitable for each scene in combination with means for determining the scene. For example, as for soccer, it is normally possible to set scenes such as an intrusion into around a penalty area, the goal, a free kick, a corner kick, and a throw-in.

In the case of learning the athletics in which there are teams competing against each other, information may be appended that tells on which team the virtual viewpoint path data places more importance. By doing this, learning is also possible in which the user selects the team such that the score of the virtual viewpoint path giving better viewing of the selected team will become higher.

Figure 7:
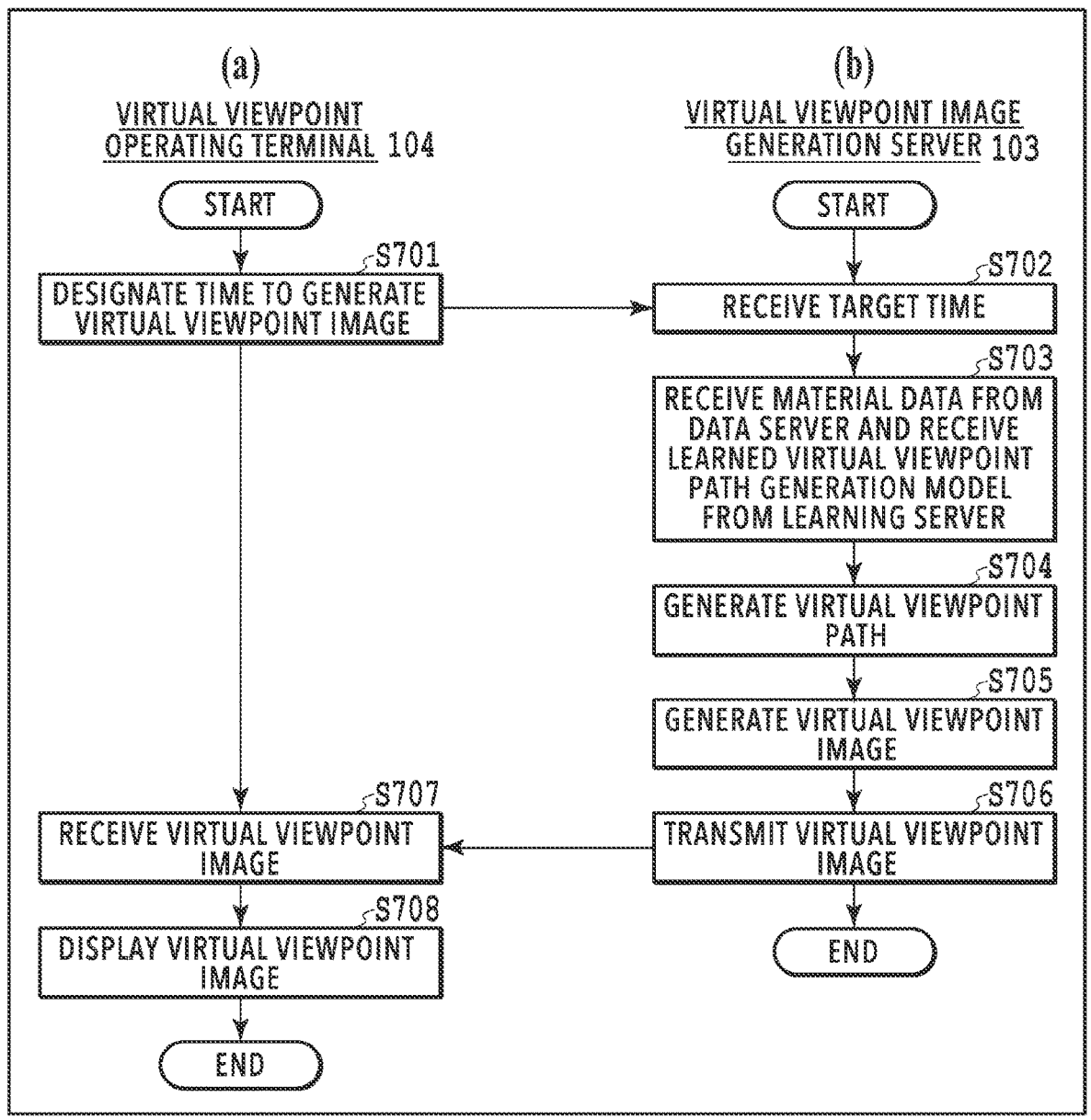
FIG. 7 is a flowchart of virtual viewpoint image generation processing in the first embodiment.

FIG. 7 is a flowchart showing a flow of processing in which the virtual viewpoint path data is automatically generated using the virtual viewpoint path generation unit 305 at the time of the generation of the virtual viewpoint image data. Descriptions will be given of control over each apparatus in the system diagrams separately and in the order of each apparatus working in cooperation with each other.

The virtual viewpoint operating terminal 104 generates, by the virtual viewpoint operating unit 309, the timecode representing target time to generate the virtual viewpoint path generated based on the operation of the user (hereinafter referred to as the target time to generate the virtual viewpoint path) and transmits the generated timecode to the virtual viewpoint image generation server 103 via the data transmission unit 311 (S701). Examples of the user operation can be input of the target time to generate the virtual viewpoint path using the keyboard or the like and selection of a range of the target time to generate the virtual viewpoint path by means of a seek bar or the like using the mouse or the like. Specific scenes such as a try scene and a goal scene may also be designated.

Incidentally, although described herein is the configuration in which the user designates the time and the scene, the designation may be performed automatically by the system. Each of the frames of the multi-viewpoint image is classified into scenes in which the score or a priority level is set in advance by using image recognition technology such that an area including the frame having the high score or the higher priority may be selected automatically as the target time to generate the virtual viewpoint path.

The virtual viewpoint image generation server 103 receives, by the data reception unit 307, the timecode indicating the target time to generate the virtual viewpoint path (S702).

The virtual viewpoint image generation server 103 receives from the data server 101 the material data used for generating the virtual viewpoint image data via the data reception unit 307 based on the timecode indicating the received target time to generate the virtual viewpoint path and also receives from the learning server 102 a learned virtual viewpoint path generation model via the data reception unit 307 (S703). The material data used for generating the virtual viewpoint image data is foreground texture data and the foreground three-dimensional model data of a frame specified by the timecode indicating the target time to generate the virtual viewpoint path.

The virtual viewpoint image generation server 103 automatically generates, by the virtual viewpoint path generation unit 305, the virtual viewpoint path data using the received learned virtual viewpoint path generation model based on the foreground three-dimensional model data included in the received material data (S704).

The virtual viewpoint image generation server 103 generates, by the virtual viewpoint image generation unit 306, the virtual viewpoint image data using the material data used for generating the received virtual viewpoint image data and the virtual viewpoint path data generated by the virtual viewpoint path generation unit 305 (S705).

The virtual viewpoint image generation server 103 transmits the generated virtual viewpoint image data to the virtual viewpoint operating terminal 104 via the data transmission unit 308 (S706).

The virtual viewpoint operating terminal 104 receives the virtual viewpoint image data from the virtual viewpoint image generation server 103 via the data reception unit 312 (S707).

The virtual viewpoint operating terminal 104 displays the received virtual viewpoint image by the display unit 310 (S708).

Note that in the processing shown in FIG. 7, the virtual viewpoint image generation server 103 generates the virtual viewpoint path using the learned virtual viewpoint path generation model received from the learning server 102. However, the virtual viewpoint path may also be generated by the learning server 102. That is, once the virtual viewpoint image generation server 103 transmits the foreground three-dimensional model data or the like to the learning server 102, the learning server 102 generates the virtual viewpoint path data using the learned virtual viewpoint path generation model and transmits it to the virtual viewpoint image generation server 103 and the virtual viewpoint image generation server 103 may also generate the virtual viewpoint image data based on the received virtual viewpoint path data.

Figure 8:
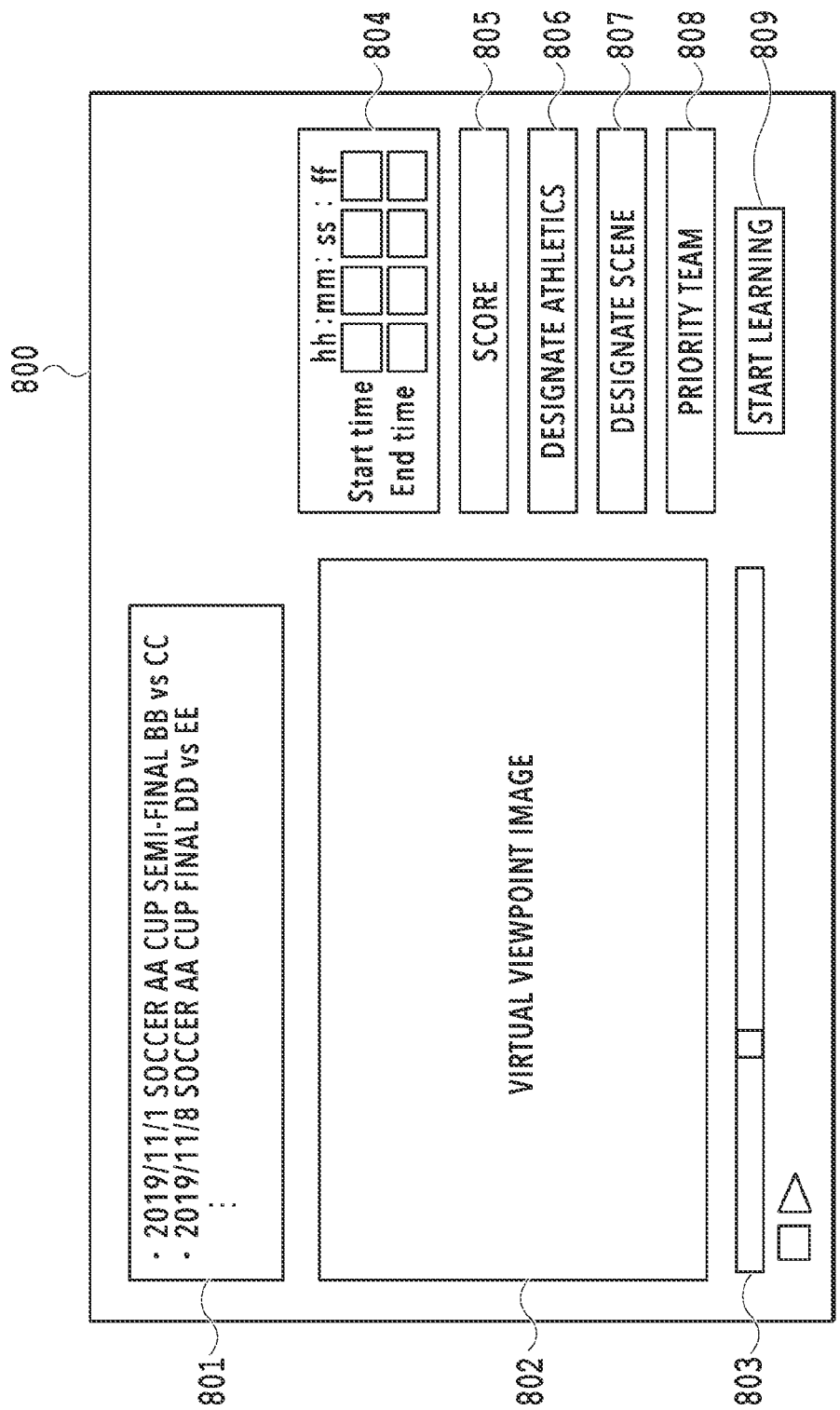
FIG. 8 shows an example of a UI screen in learning a virtual viewpoint path generation unit 305.

FIG. 8 shows an example of a UI screen 800 in learning the virtual viewpoint path generation unit 305. This example shows the UI screen in the case of learning using the virtual viewpoint path data generated in advance.

Content to be learned is selected from a content list 801. The virtual viewpoint path data included in the selected content can be checked on a virtual viewpoint image playback window 802. A playback operation of the virtual viewpoint image can be performed using a group of operating buttons. The user designates the time to be learned through a timecode designation window 804 and can designate, as an option, an evaluation score of the virtual viewpoint path of the time, the type of athletics, the type of scene and a team with the higher priority through windows 805 to 808. Learning starts by pushing a learning start button 809.

Figure 9:
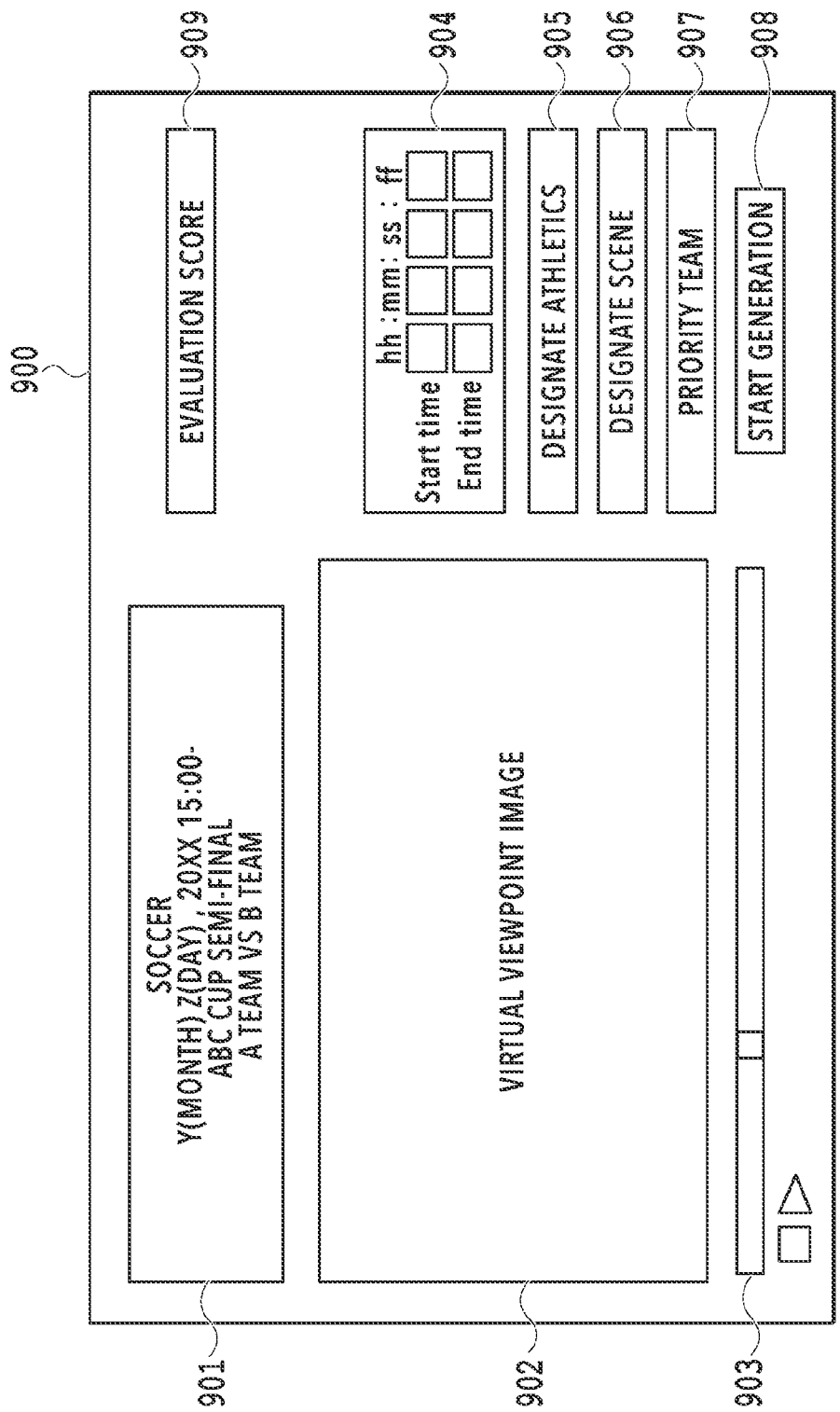
FIG. 9 shows an example of a UI screen for generating a virtual viewpoint image.

FIG. 9 shows an example of a UI screen 900 for editing the virtual viewpoint image generated based on the virtual viewpoint path data generated by the virtual viewpoint path generation unit 305. The UI screen 900 comprises a content information display unit 901 displaying the content for which the virtual viewpoint image is to be generated. Virtual viewpoint image identification information is displayed on a window of the content information display unit 901. An operating unit 903 is used to perform the playback operation of the virtual viewpoint image and comprises the seek bar, a playback button, and a stop button. In order to generate the virtual viewpoint image data, the target time to generate the data is designated by the input of the timecode to a window 904. Further, as an option, the type of athletics. a scene and a team with the higher priority can be designated through windows 905, 906, and 907. Pressing down a generation start button 908 causes the data to be transmitted to the virtual viewpoint image generation server 103 to generate the virtual viewpoint image data.

The UI screen 900 also comprises an evaluation score window 909 indicating how well the automatically-generated virtual viewpoint path data has been made.

Some of the foreground three-dimensional model data included in the material data generates a difficult scene having poor quality of the virtual viewpoint image regardless of the position of the virtual viewpoint. For example, in a state in which a plurality of players are densely gathered in a cluster such as a scrum in rugby, it is impossible to accurately generate the foreground three-dimensional model data for each player, which results in a reduction in image quality of the virtual viewpoint image. In a case where the object is hidden behind a pole or the like, the three-dimensional model does not keep its shape and this makes it impossible to accurately generate the foreground three-dimensional model data, thereby reducing the image quality of the virtual viewpoint image.

Accordingly, in learning, in a case where the input foreground three-dimensional model data includes a frame which generates the difficult scene, the virtual viewpoint path is given learning such that the evaluation score of the virtual viewpoint path to be automatically-generated will be low. This allows the virtual viewpoint path generation unit 305 to calculate the evaluation score to be low in the case of the virtual viewpoint path data with a tendency to cause the virtual viewpoint image to be generated to include the difficult scene. In addition, by displaying the evaluation score of this virtual viewpoint path data on the UI screen 900, the user can numerically grasp how well the path data has been made.

As described above, according to the first embodiment, it is possible to generate the virtual viewpoint image data by automatically generating the virtual viewpoint path data without requiring the user to perform a complicated virtual viewpoint operation.

Second Embodiment

In a second embodiment, a plurality of frames which are to be the key when generating the virtual viewpoint image data are designated to automatically generate a piece of virtual viewpoint data from each key frame. Virtual viewpoint data connecting the generated virtual viewpoints of the plurality of key frames is further automatically generated and the resultant data is set to be the virtual viewpoint path data. Automatically generating one virtual viewpoint from one frame makes it possible to reduce the learning cost and a virtual viewpoint path data generation cost.

Regarding a learning method, in one session of learning, the foreground three-dimensional model data which is the input data and the virtual viewpoint data which is the training data are not input for the plurality of sequential frames but for one frame. The other flows are identical to corresponding flows in the first embodiment, the sequential frames may be input for learning but the learning cost and the virtual viewpoint path data generation cost are reduced by lessening the number of frames used for one learning session.

Figure 10:
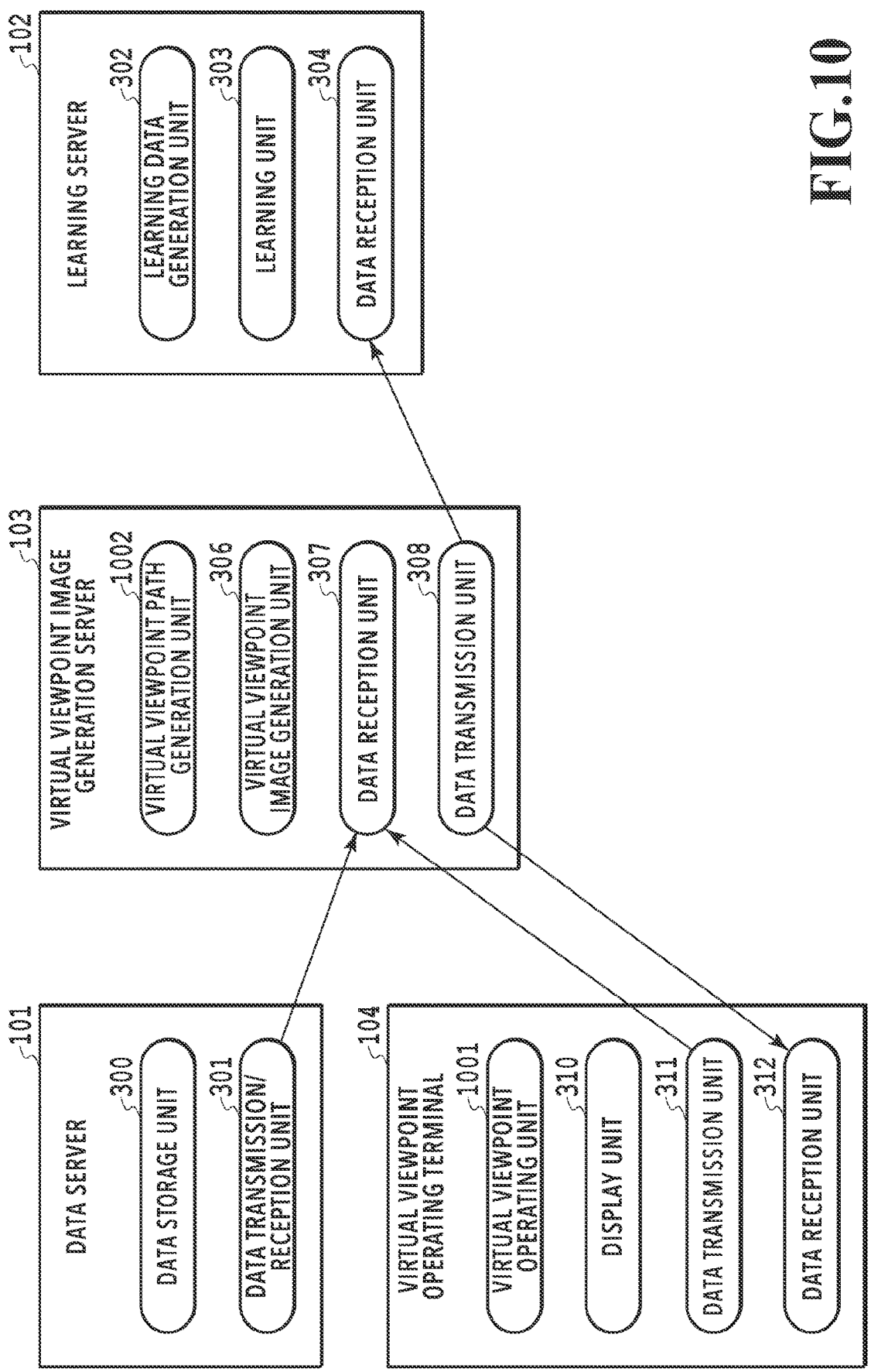
FIG. 10 is a diagram showing a software configuration realizing a second embodiment.

FIG. 10 is a diagram showing a function configuration realizing the second embodiment. The same reference numeral is added to the same block as that of the first embodiment and the description thereof will be omitted.

A virtual viewpoint operating unit 1001 of the virtual viewpoint operating terminal 104 designates the key frame for the virtual viewpoint image generation server 103 and requires the generation of the virtual viewpoint data.

A virtual viewpoint path generation unit 1002 of the virtual viewpoint image generation server 103 further comprises a function of generating the virtual viewpoint path data based on the virtual viewpoint data of the key frame. As a method of smoothly connecting the virtual viewpoints generated from the key frames, an algorithm in which a spline curve is drawn is used. Further, the zoom value of each key frame is linearly changed. Although a drawing method of the spline curve is used in the present embodiment, other methods of generating the virtual viewpoint which interpolates the virtual viewpoints and smoothly connects these viewpoints may also be used. The virtual viewpoints may also simply be connected to each other by a straight line.

Moreover, the number of frames between the key frames when connecting the key frames may also be changed depending on a distance. Note that the larger the number of the frames between the key frames is, the slower the completed virtual viewpoint image looks at the time of playback at an identical frame rate.

Figure 11:
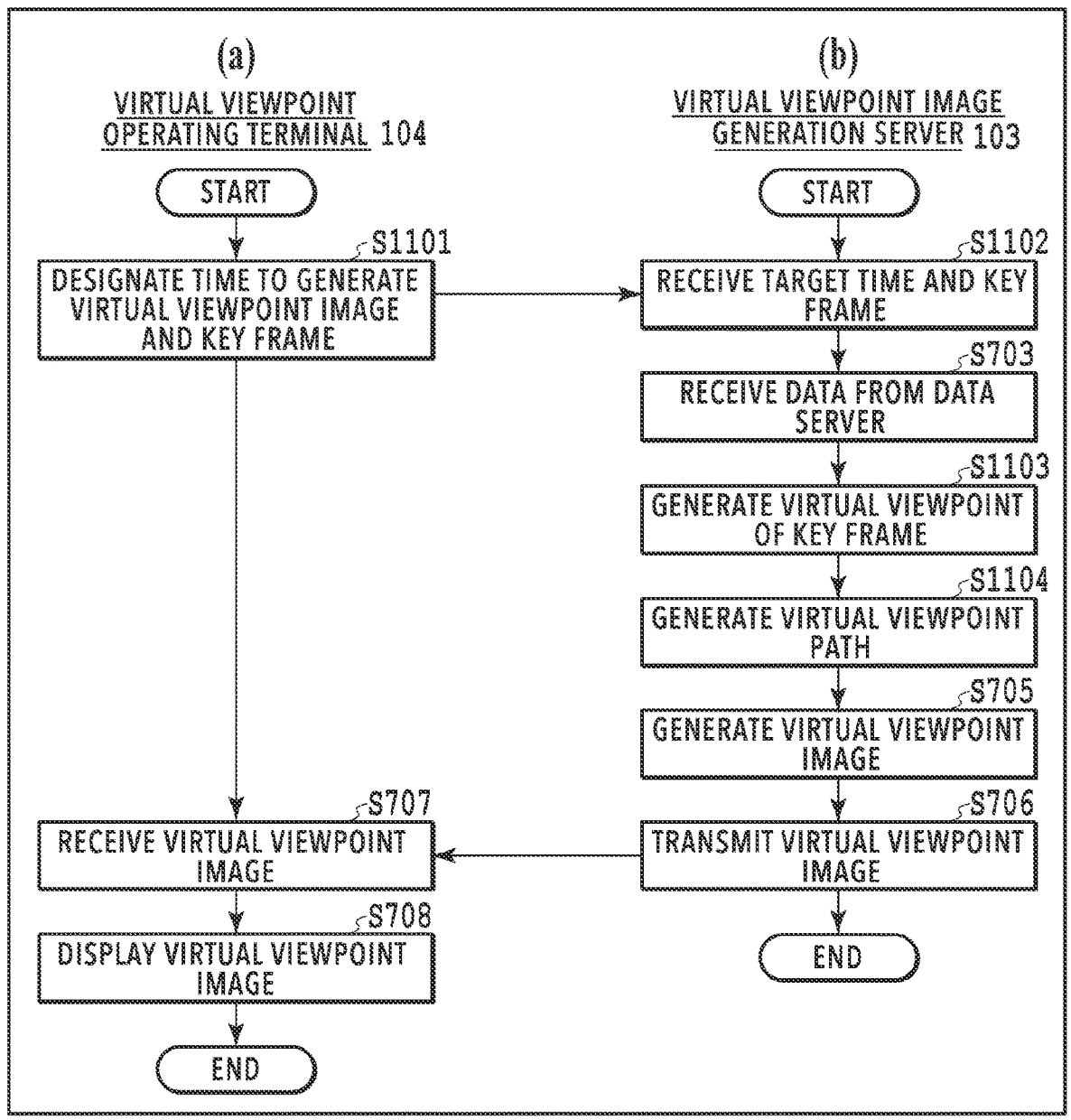
FIG. 11 is a flowchart of virtual viewpoint image generation processing in the second embodiment.

FIG. 11 is a flowchart showing a flow of virtual viewpoint image generation processing in the second embodiment. The same reference numeral is added to the same processing as that of the first embodiment and the description thereof will be omitted.

A virtual viewpoint path generation unit 1002 of the virtual viewpoint operating terminal 104 designates the target time to generate the virtual viewpoint image data and a plurality of timecodes of the key frames and transmits them to the virtual viewpoint image generation server 103 (S1101).

The virtual viewpoint image generation server 103 receives the target time to generate and the timecode data indicating key frames via the data reception unit 307 (S1102).

The virtual viewpoint image generation server 103 generates, by the virtual viewpoint path generation unit 1002, the virtual viewpoint data of the key frame based on the foreground three-dimensional model data of the key frame included in the received material data (S1103).

The virtual viewpoint image generation server 103 further generates, by the virtual viewpoint path generation unit 1002, the virtual viewpoint path data smoothly connecting the virtual viewpoints of the key frames (S1104). Subsequent processing is similar to that of the first embodiment.

As described above, according to the second embodiment, it is possible to automatically generate the virtual viewpoint path data based on the virtual viewpoint generated from the foreground three-dimensional model data of one frame and this allows larger reductions in the learning cost and the virtual viewpoint path data generation cost as compared with a case where the virtual viewpoint path data is generated based on the foreground three-dimensional model data of the plurality of the frames.

OTHER EMBODIMENTS

Incidentally, the virtual viewpoint path generation unit 305 of each processing unit described above uses the learned model obtained by the machine learning to perform the processing. However, rule-based processing using a look-up table (LUT) or the like may also be performed. In that case, the relationship between the input data and the output data is created as the LUT in advance for example. Then, the created LUT is preferably stored in memory of the virtual viewpoint image generation server 103. In the case of performing the processing of the virtual viewpoint path generation unit 305, the output data can be obtained with reference to the stored LUT. In other words, the LUT performs the processing of the above-described processing unit as a program for performing processing equivalent to the processing by the above-described processing unit by working in cooperation, for example, with the CPU or the GPU.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit [ASIC]) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit [CPU], micro processing unit [MPU], field programmable gate array [FPGA], digital signal processor [DSP], data flow processor [DFP], neural processing unit [NPU]) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc [CD], digital versatile disc [DVD], or Blu-ray Disc [BD]™), a flash memory device, a memory card, and the like.

The present disclosure is capable of reducing the time and effort required for the user concerning the designation of the virtual viewpoint for generating the virtual viewpoint image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-052631, filed Mar. 24, 2020, which is hereby incorporated by reference wherein in its entirety.

The invention claimed is:
1. An information processing apparatus comprising:
one or more memories storing instructions; and
one or more processors executing the instructions to function as:
an obtaining unit configured to obtain information for specifying a position of an object included in multi- viewpoint image data obtained by image capturing using a plurality of imaging apparatuses; and a generation unit configured to generate virtual viewpoint path data to generate virtual viewpoint image data by inputting the information obtained by the obtaining unit to an output unit which is a learned model learned from the virtual viewpoint path data to be training data and at least information for specifying a position of an object to be input data corresponding to the virtual viewpoint path data and is configured to output virtual viewpoint data by receiving input of the information for specifying the position of the object, wherein the output unit outputs pieces of virtual viewpoint data corresponding to a plurality of frames which are not sequential, and the generation unit interpolates the pieces of virtual viewpoint data output from the output unit to generate the virtual viewpoint path data.

2. The information processing apparatus according to claim 1, wherein the obtaining unit further obtains additional information for generating the virtual viewpoint path data, and the output unit outputs the virtual viewpoint path data based on the information and the additional information.

3. The information processing apparatus according to claim 2, wherein the additional information includes at least one of a type of athletics, team information about an object, information about a type of an object, field coordinate information of athletics, goal coordinate information and various types of line coordinate information.

4. The information processing apparatus according to claim 1, wherein the obtaining unit further obtains a timecode for designating target time to generate the virtual viewpoint image data, and the generation unit generates the virtual viewpoint data based on the information of the frame corresponding to the timecode.

5. The information processing apparatus according to claim 1, wherein the information is three-dimensional model data representing the position of the object included in the multi-viewpoint image data.

6. The information processing apparatus according to claim 5, wherein the three-dimensional model data is three-dimensional model data of a foreground object.

7. The information processing apparatus according to claim 1, wherein the generation unit calculates an evaluation score evaluating a virtual viewpoint path according to the information when generating the virtual viewpoint path data.

8. The information processing apparatus according to claim 1, wherein the output unit is an external apparatus connected via a network.

9. The information processing apparatus according to claim 1, wherein the generation unit includes the output unit.

10. An information processing method, the method comprising the steps of:

obtaining information for specifying a position of an object included in multi-viewpoint image data obtained by image capturing using a plurality of imaging apparatuses; and generating virtual viewpoint path data to generate virtual viewpoint image data by inputting the obtained information to an output unit which is a learned model learned from the virtual viewpoint path data to be training data and at least information for specifying a position of an object to be input data corresponding to the virtual viewpoint path data and is configured to output virtual viewpoint data by receiving input of the information for specifying the position of the object, wherein the output unit outputs pieces of virtual viewpoint data corresponding to a plurality of frames which are not sequential, and the generating includes interpolating the pieces of virtual viewpoint data output from the output unit to generate the virtual viewpoint path data.

11. A non-transitory computer readable storage medium storing a program to cause a computer to carry out an information processing method, the method comprising the steps of:

obtaining information for specifying a position of an object included in multi-viewpoint image data obtained by image capturing using a plurality of imaging apparatuses; and generating virtual viewpoint path data to generate virtual viewpoint image data by inputting the obtained information to an output unit which is a learned model learned from the virtual viewpoint path data to be training data and at least information for specifying a position of an object to be input data corresponding to the virtual viewpoint path data and is configured to output virtual viewpoint data by receiving input of the information for specifying the position of the object, wherein the output unit outputs pieces of virtual viewpoint data corresponding to a plurality of frames which are not sequential, and the generating includes interpolating the pieces of virtual viewpoint data output from the output unit to generate the virtual viewpoint path data.

* * * * *